(12) United States Patent
Pascanu et al.

(10) Patent No.: US 10,632,618 B2
(45) Date of Patent: Apr. 28, 2020

(54) NEURAL NETWORKS FOR SELECTING ACTIONS TO BE PERFORMED BY A ROBOTIC AGENT

(71) Applicant: DeepMind Technologies Limited, London (GB)

(72) Inventors: Razvan Pascanu, Letchworth Garden City (GB); Raia Thais Hadsell, London (GB); Mel Vecerik, London (GB); Thomas Rothoerl, London (GB); Andrei-Alexandru Rusu, London (GB); Nicolas Manfred Otto Heess, London (GB)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 16/380,125

(22) Filed: Apr. 10, 2019

(65) Prior Publication Data
US 2019/0232489 A1  Aug. 1, 2019

Related U.S. Application Data

(63) Continuation of application No. PCT/US2017/055894, filed on Oct. 10, 2017.
(Continued)

(51) Int. Cl.
*B25J 9/16* (2006.01)
*G06N 3/04* (2006.01)
(Continued)

(52) U.S. Cl.
CPC .............. *B25J 9/163* (2013.01); *B25J 9/1671* (2013.01); *G05B 13/027* (2013.01); *G06N 3/008* (2013.01);
(Continued)

(58) Field of Classification Search
CPC ....... B25J 9/163; B25J 9/1671; G05B 13/027; G06N 3/0445; G06N 3/08
See application file for complete search history.

(56) References Cited

U.S. PATENT DOCUMENTS

2019/0025917 A1* 1/2019 Francis .................... A61F 2/68

OTHER PUBLICATIONS

Matthew Hausknecht and Peter Stone, "Deep Reinforcement Learning in Parameterized Action Space", Feb. 16, 2016, arXiv, pp. 1-12 (Year: 2016).*

(Continued)

*Primary Examiner* — Kamran Afshar
*Assistant Examiner* — Ying Yu Chen
(74) *Attorney, Agent, or Firm* — Fish & Richardson P.C.

(57) ABSTRACT

A system includes a neural network system implemented by one or more computers. The neural network system is configured to receive an observation characterizing a current state of a real-world environment being interacted with by a robotic agent to perform a robotic task and to process the observation to generate a policy output that defines an action to be performed by the robotic agent in response to the observation. The neural network system includes: (i) a sequence of deep neural networks (DNNs), in which the sequence of DNNs includes a simulation-trained DNN that has been trained on interactions of a simulated version of the robotic agent with a simulated version of the real-world environment to perform a simulated version of the robotic task, and (ii) a first robot-trained DNN that is configured to receive the observation and to process the observation to generate the policy output.

20 Claims, 4 Drawing Sheets

Related U.S. Application Data

(60) Provisional application No. 62/406,363, filed on Oct. 10, 2016.

(51) Int. Cl.
    *G06N 3/08*         (2006.01)
    *G05B 13/02*      (2006.01)
    *G06N 3/00*         (2006.01)

(52) U.S. Cl.
    CPC ......... *G06N 3/0445* (2013.01); *G06N 3/0454* (2013.01); *G06N 3/08* (2013.01)

(56) References Cited

OTHER PUBLICATIONS

Sergey Levine, Chelsea Finn, Trevor Darrell, and Pieter Abbeel, "End-to-End Training of Deep Visuomotor Policies", Apr. 2016, Journal of Machine Learning Research 17 (2016), pp. 1-40. (Year: 2016).*

Jakob N. Foerster, Yannis M. Assael, Nando de Freitas, and Shimon Whiteson, "Learning to Communicate with Deep Multi-Agent Reinforcement Learning", May 24, 2016, arXiv, pp. 1-13. (Year: 2016).*

Guillaume Lample and Devendra Singh Chaplot, "Playing FPS Games with Deep Reinforcement Learning", Sep. 18, 2016, arXiv, pp. 1-7. (Year: 2016).*

'Braylan et al [online],' "Resue of neural modules for general video game playing," Dec. 2015, [retrieved Apr. 10, 2019], URL<https://arxiv.org/pdf/1512.01537.pdf> 7 pages.

'Devin et al [online]', "Learning Modular Network Policies for Multi-Task and Multi-Robot Transfer", Sep. 2016, [retrieved on Apr. 10, 2019] URL <https://arxiv.org/pdf/1609.07088.pdf>, 8 pages.

'Hadsell et al [online]', "Progressive nets for simulation to robot transfer," RSS 2016 Workshop on Limits and Potentials of Deep Learning in Robotics, Jun. 2016, [retrieved on Apr. 10, 2019] URL<http://juxi.net/workshop/deep-learning-rss-2016/slides/Raia_Hadsell_RSS_DL_workshop.pdf>, 32 pages.

'Rasu et al [online]' "Progressive Neural Networks," arXiv, Sep. 2016, [retrieved on Apr. 10, 2019] URL<https://arxiv.org/pdf/1606.04671.pdf>, 14 pages.

'Zhu et al [online]', "Target-driven visual navigation in indoor scenes using deep reinforcement learning," Sep. 2016, [retrieved Apr. 10, 2019], URL<https://arxiv.org/pclf/1609.05143.pdf>, 8 pages.

PCT International Search Report and Written Opinion in the International Appln. No. PCT/US2017/055894, dated Jan. 17, 2018, 15 pages.

Barrett et al, "Transfer learning for reinforcement learning on a physical robot," Ninth International Conference on Autonomous Agents and Multiagent Systems—Adaptive Learning Agents Worshops, May 2010, 6 pages.

Bousmalis et al, "Domain separation networks," 29th Conference on Neural Information Processing Systems, Aug. 22, 2016, 15 pages.

Ganin et al., "Domain-adversarial training of neural networks,"Journal of Machine Learning Research, Apr. 2016, 35 pages.

Gu et al, "Continuous Deep Q-Learning with Model-based Acceleration," International Conference on Machine Learning, 2016, 10 pages.

Heess et al, "Learning continuous control policies by stochastic value gradients," Advances in Neural Information Processing Systems 28: Annual Conferences on Neural Information Processing Systems 2015, Dec. 2015, 9 pages.

James et al, "3D simulation for robot arm control with deep q-learning," ArXiv E-prints, Dec. 2016, 6 pages.

Levine et al, "End-to-end training of deep visuomotor policies," CoRR, Apr. 2016, 40 pages.

Levine et al, "Learning contact rich manipulation skills with guided policy search," IEEE International Conference on Robotics and Automation, Feb. 2015, 8 pages.

Levine et al, "Learning hand-eye coordination for robotic grasping with deep learning and large scale data collection," CoRR, Aug. 2016, 12 pages.

Levine et al, "Learning neural network policies with guided policy search under unknown dynamics," Z. Ghahramani, M. Welling, C. Cortes, N.D. Lawrence, and K.Q. Weinberger, editors, Advances in Neural Information Processing Systems 27, 11 pages.

Lillicrap et al, "Continuous control with deep reinforcement learning," CoRR, Februrary 2016, 14 pages.

Long et al, "Learning transferable features with deep adaptation networks," Proceedings of the 32nd International Conference on Machine Learning, May 2015, 9 pages.

Mnih et al, "Asynchronous methods for deep reinforcement learning," Int'l Conf. on Machines Learning, Jun. 2016, 19 pages.

Mnih et al, "Human level control through deep reinforcement learning," Macmillan Publishers Limited, Feb. 2015, 13 pages.

Peng et al, "Learning deep object detectors from 3D models," 2015 IEEE International Conference on Computer Visions, Oct. 2015, 9 pages.

Pinto et al, "Supersizing self-supervision: learning to grasp from 50K tries and 700 robot hours," ICRA, Sep. 2015, 8 pages.

Pinto et al, The curious robot: learning visual representations via physical interaction, CoRR, Jul. 2016, 17 pages.

Rusu et al, "Progressive Neural Networks," arXiv, Sep. 2016, 14 pages.

Schulman et al, "High-dimensional continuous control using generalized advantage estimation," Proceedings of the International Conference on Learning Representations, Oct. 2018, 14 pages.

Schulman et al, "Trust region policy organization," Proceeding of the 32nd International Conference on Machine Learning, Apr. 2017, 16 pages.

Su et al, "Render for CNN: viewpoint estimation in images using CNNs trained with rendered 3D model views," 2015 IEEE International Conference on Computer Visions, Dec. 2015, 9 pages.

Todorov et al, "MuJoCo: A physics engine for model-based control," International Conference on Intelligent Robots and Systems, 2012, 8 pages.

Tzeng et al, "Deep domain confusion. maximizing for domain invariance," CoRR, Dec. 2014, 9 pages.

Tzeng et al, "Simultaneous deep transfer across domains and tasks," IEEE International Conference on Computer Vision, Dec. 2015, 9 pages.

Tzeng et al, "Towards adapting deep visuomotor representations from simulated to real environments," CoRR, Apr. 2016, 10 pages.

Yosinski et al, "How transferable are features in deep neural networks?" Advances in Neural Information Processing Systems, Advances in Neural Information Processing Systems, Nov. 2014, 14 pages.

\* cited by examiner

NEURAL NETWORKS FOR SELECTING ACTIONS TO BE PERFORMED BY A ROBOTIC AGENT

CROSS-REFERENCE TO RELATED APPLICATION

This application claims the benefit of International Application No. PCT/US2017/055894, filed on Oct. 10, 2017, which claims priority to U.S. Provisional Application Ser. No. 62/406,363, filed on Oct. 10, 2016. The disclosure of these prior applications is considered part of and is incorporated by reference in the disclosure of this application.

BACKGROUND

This specification relates to selecting actions to be performed by a reinforcement learning agent.

Reinforcement learning agents interact with an environment by receiving an observation that characterizes the current state of the environment, and in response, performing an action.

Some reinforcement learning systems use neural networks to select the action to be performed by the agent in response to receiving any given observation.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations.

In general, one innovative aspect may be embodied in a system including a neural network system implemented by one or more computers. The neural network system is configured to receive an observation characterizing a current state of a real-world environment being interacted with by a robotic agent to perform a robotic task and to process the observation to generate a policy output that defines an action to be performed by the robotic agent in response to the observation. The neural network system includes a sequence of deep neural networks (DNNs). The sequence of DNNs includes a simulation-trained DNN that has been trained on interactions of a simulated version of the robotic agent with a simulated version of the real-world environment to perform a simulated version of the robotic task. The simulation-trained DNN includes a first plurality of indexed layers, and the simulation-trained DNN is configured to receive the observation and process the observation through each layer in the first plurality of indexed layers to generate a respective layer output for each layer in the first plurality of indexed layers. The sequence of DNNs further includes a first robot-trained DNN. This may have been trained on interactions of the robotic agent with the real-world environment to perform the robotic task. The first robot-trained DNN includes a second plurality of indexed layers. The first robot-trained DNN is configured to receive the observation and to process the observation through each layer in the second plurality of indexed layers to generate the policy output, and one or more of the layers in the second plurality of indexed layers are each configured to receive as input (i) a layer output generated by a preceding layer of the first robot-trained DNN, and (ii) a layer output generated by a preceding layer of the simulation-trained DNN, wherein a preceding layer is a layer whose index is one less than the index of the layer.

Particular embodiments of the subject matter described in this specification can be implemented so as to realize one or more of the following advantages. Deep reinforcement learning algorithms are too slow to achieve performance on a real-world robot, but can be demonstrated in simulated environments. By using a neural network system as described in this specification to bridge the reality gap and transfer learned policies from simulation to the real world, an action selection policy for a robotic agent can be effectively determined more quickly and using fewer computing resources than existing approaches. That is, the neural network system described in this specification allows deep reinforcement learning to be used to effect fast policy learning on a real robot.

In some implementations, by virtue of the simulation-trained DNN being configured to have sufficient capacity and depth to learn the task from scratch and one or more robot-trained DNNs having more minimal capacity, maximal transfer and faster learning of different tasks can be accomplished. The capacity and structure of the simulation-trained DNN and robot-trained DNNs do not need to be identical, thus allowing for solving different tasks, including different input modalities. Additionally, after training, the trained neural network system may have a smaller computational footprint when being used to select actions, i.e., using fewer processing resources and less memory, while still effectively selecting actions to be performed by the robotic agent. Further, while existing approaches are unable to accommodate changing network morphology or new input modalities, by using a progressive network, the neural network system described in this specification offers flexibility for adding new capacity, including new input connections, when transferring to new tasks. This is also advantageous for bridging the reality gap, to accommodate dissimilar inputs between simulation and real sensors.

In some implementations, the first robot-trained DNN has a smaller capacity than the simulation-trained DNN. The capacity of a neural network can be calculated. It broadly relates to the number of parameters of a neural network and thus the first robot-trained DNN may have a smaller number of parameters, such as weights, than the simulation-trained DNN. It has been found empirically that this does not hinder, and may encourage learning, whilst reducing computational load. In a similar manner the first robot-trained DNN may have a narrower architecture than the simulation-trained DNN, for example having fewer nodes in a corresponding layer.

In some implementations, the layers of the first robot-trained DNN and of the simulation-trained DNN may each include a respective recurrent neural network layer. This facilitates generating a policy output based upon a history of observations.

The policy output may define a discrete or continuous policy. For example the output may provide a value in a continuous action space representing an action to be performed, or there may be one value representing an action probability for each possible action in a discrete action space. For example, the former may employ a DDPG DNN, the latter an A3C DNN (see later for acronyms). In the latter case, an output layer of the DNNs may comprise a softmax layer to provide the policy and, typically, a linear output for an associated value function. Other frameworks may also be employed—for example the policy may be implicit in the output from a Deep Q Network (DQN), for example as value and advantage function outputs. Optionally, therefore, an action subsystem may select an action to be performed by the robotic agent based on the policy output. This may cause the robotic agent to perform the selected action. There may be multiple policy outputs if the robotic agent has multiple degrees of freedom to control.

The system may include a second robot-trained DNN laterally coupled to the first robot-trained DNN and to the simulation-trained DNN in a similar manner to that previously described. This second robot-trained DNN may receive different data (to the observation) also characterizing the current state of the environment, in conjunction with or potentially instead of the observation. The second robot-trained DNN may be trained to perform different task to the first robot-trained DNN, or it may be trained to perform the same task in which case the second robot-trained DNN may define the actions to be performed. Further DNNs may be chained in a similar manner.

A method of training the system may include determining trained values of parameters of one or more of the DNNs in the sequence of DNNs. Thus if the simulation-trained DNN has already been trained, the robot-trained DNN(s) may be trained in the real-world environment, thus enabling them to use features learned by the simulation-trained DNN. The trained values of the parameters of the simulation-trained DNN may be fixed to avoid forgetting the simulation-based training. The simulation-trained DNN may be trained with a simulated version of the real-world environment.

The training of a robot-trained DNN may involve receiving as input (i) a layer output generated by a layer preceding the output layer of the first robot-trained DNN, and (ii) a layer output generated by a layer preceding an output layer of the simulation-trained DNN; applying a first set of parameters to the layer output generated by a layer preceding the output layer the first robot-trained DNN; and applying a second set of parameters to the layer output generated by a layer preceding the output layer of the simulation-trained DNN. The method may further comprise initializing values of the second set of parameters to match trained values of parameters of the output layer of the simulation-trained DNN, and optionally initializing values of the first set of parameters to zero. For example, the method may initialize some or all of the weights of connections to the output layer of a DNN column from the last layer of a previous DNN column to the output weights of the previous DNN column, and optionally initialize some or all of the weights to the output layer of a DNN column within the column to zero. This can help exploration, in particular offsetting the risk that the rewards in the real world are so sparse that reinforcement learning does not take off by increasing the chance of a real-world reward.

A method of using the system may include receiving an observation characterizing a current state of a real-world environment being interacted with by a robotic agent to perform a robotic task; processing the observation using the neural network system; and selecting an action to be performed by the robotic agent in response to the observation using the policy output.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a reinforcement learning system that selects actions to be performed by a reinforcement learning agent interacting with a real-world environment. In order to interact with the real-world environment, the agent receives data characterizing the current state of the real-world environment and performs an action from an action space (e.g., a discrete action space or a continuous action space) in response to the received data. Data characterizing a state of the real-world environment will be referred to in this specification as an observation.

In some implementations, the robotic agent may be a robot interacting with the real-world environment to accomplish a specific task. In other implementations, the robotic agent may be an autonomous or semi-autonomous vehicle navigating through the real-world environment. In these implementations, the actions may be points in a space of possible control inputs to control the robot or the autonomous vehicle.

In some cases, the observations characterize states of the environment using low-dimensional feature vectors that characterize the state of the environment. In these cases, values of different dimensions of the low-dimensional feature vectors may have varying ranges.

In some other cases, the observations characterize states of the environment using high-dimensional pixel inputs from one or more images that characterize the state of the environment, e.g., images captured by sensors of the agent as it interacts with the real-world environment.

Figure 1:
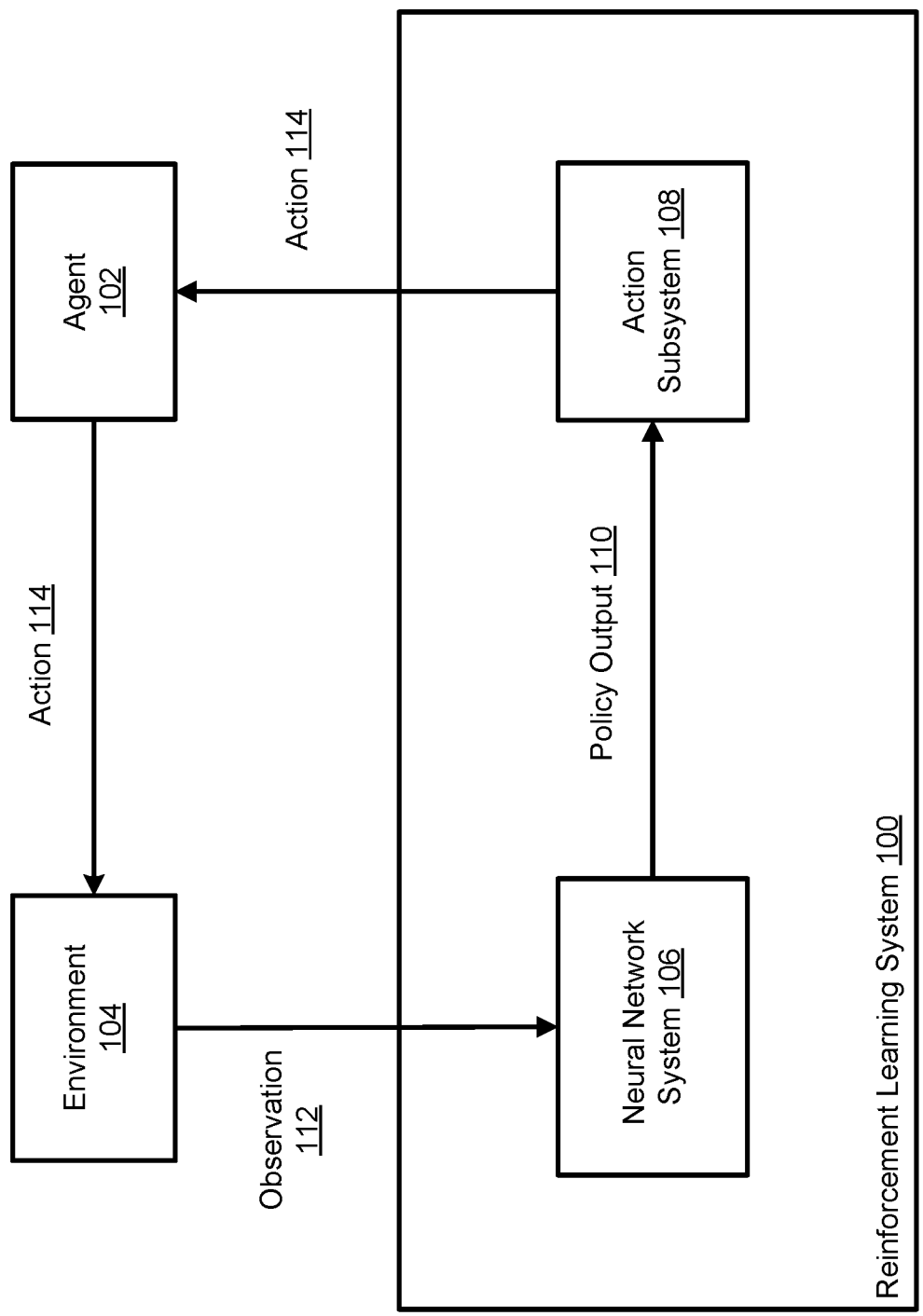
FIG. 1 shows an example reinforcement learning system.

FIG. 1 shows an example reinforcement learning system 100. The reinforcement learning system 100 is an example of a system implemented as computer programs on one or more computers in one or more locations in which the systems, components, and techniques described below are implemented.

The reinforcement learning system 100 selects actions to be performed by a reinforcement learning agent 102 interacting with a real-world environment 104 to accomplish a task. That is, the reinforcement learning system 100 receives observations, with each observation characterizing a respective state of the environment 104, and, in response to each observation, selects an action to be performed by the agent 102 in response to the observation.

In particular, the reinforcement learning system 100 selects actions using a neural network system 106 and an action subsystem 108.

The neural network system 106 is configured to receive an observation 112 characterizing a current state of a real-world environment 104 being interacted with by the agent 102 to perform a task. For example, the agent 102 is a robotic agent performing a robotic task such as a reaching task or a conveyor (motion tracking) task.

In order to bridge the reality gap and transfer learned policies from simulation to the real world, the neural network system 106 includes a sequence of deep neural networks (DNNs) that includes a simulation-trained DNN and one or more robot-trained DNNs. The simulation-trained DNN is configured to have sufficient capacity and depth to learn the task from scratch and the one or more robot-trained DNNs are configured to have more minimal capacity to enable maximal transfer and faster learning of different tasks. The capacity and structure of the simulation-trained DNN and robot-trained DNNs do not need to be identical, thus allowing for solving different tasks, including different input modalities. Each DNN in the sequence of DNNs includes multiple indexed layers and an output layer. The architecture of the neural network system 106 is described in more detail below with reference to FIG. 2.

The neural network system 106 is configured to process the observation 112 using the sequence of DNNs to generate a policy output 110. Generally, the policy output 110 defines a probability distribution over a set of possible actions that could be performed by the agent 102 in response to the observation 112 to accomplish the task. For example, in some implementations, the agent 102 has multiple degrees of freedom that includes one or more joints and one or more actuators (e.g., a robot arm that has multiple joints and fingers). In these implementations, the policy output 110 defines a probability distribution over possible actions that control the different degrees of freedom of the agent 102, e.g., actions that control the change in position of each degree of freedom of the agent 102, in response to the observation.

In some implementations, the neural network system 106 is configured to process the observation 112 using the sequence of DNNs to generate a second policy output that defines a probability distribution over a set of possible actions that could be performed by the agent 102 to accomplish a second, different task.

To allow the agent 102 to effectively interact with the real-world environment 104, the reinforcement learning system 100 trains the neural network system 106 to determine trained values of the parameters of the neural network system 106. In particular, the system 100 trains the simulation-trained DNN on interactions of a simulated version of the agent with a simulated version of the real-world environment to perform a simulated version of the task to determine trained values of parameters of the simulation-trained DNN. The system 100 then trains the robot-trained DNN on interactions of the agent with the real-world environment to perform the task to determine trained values of parameters of the robot-trained DNN while holding the trained values of the parameters of the simulation-trained DNN fixed. During training, values of parameters of the output layer of the robot-trained DNN are initialized based on the trained values of parameters of the output layer of the simulation-trained DNN to improve exploration and accelerate learning. An example process for training the neural network system 106 is described in more detail below with reference to FIG. 3.

After the neural network system 106 has generated the policy output 110, the action subsystem 108 is configured to receive the policy output 110 from the neural network system 106 and to select an action 114 to be performed by the agent 102 based on the policy output 110. In particular, the action subsystem 108 may select the action 114 by sampling the action 114 from the probability distribution defined by the policy output 110, for example selecting a most likely action. The action subsystem 108 then causes the agent to perform the selected action 114.

Figure 2:
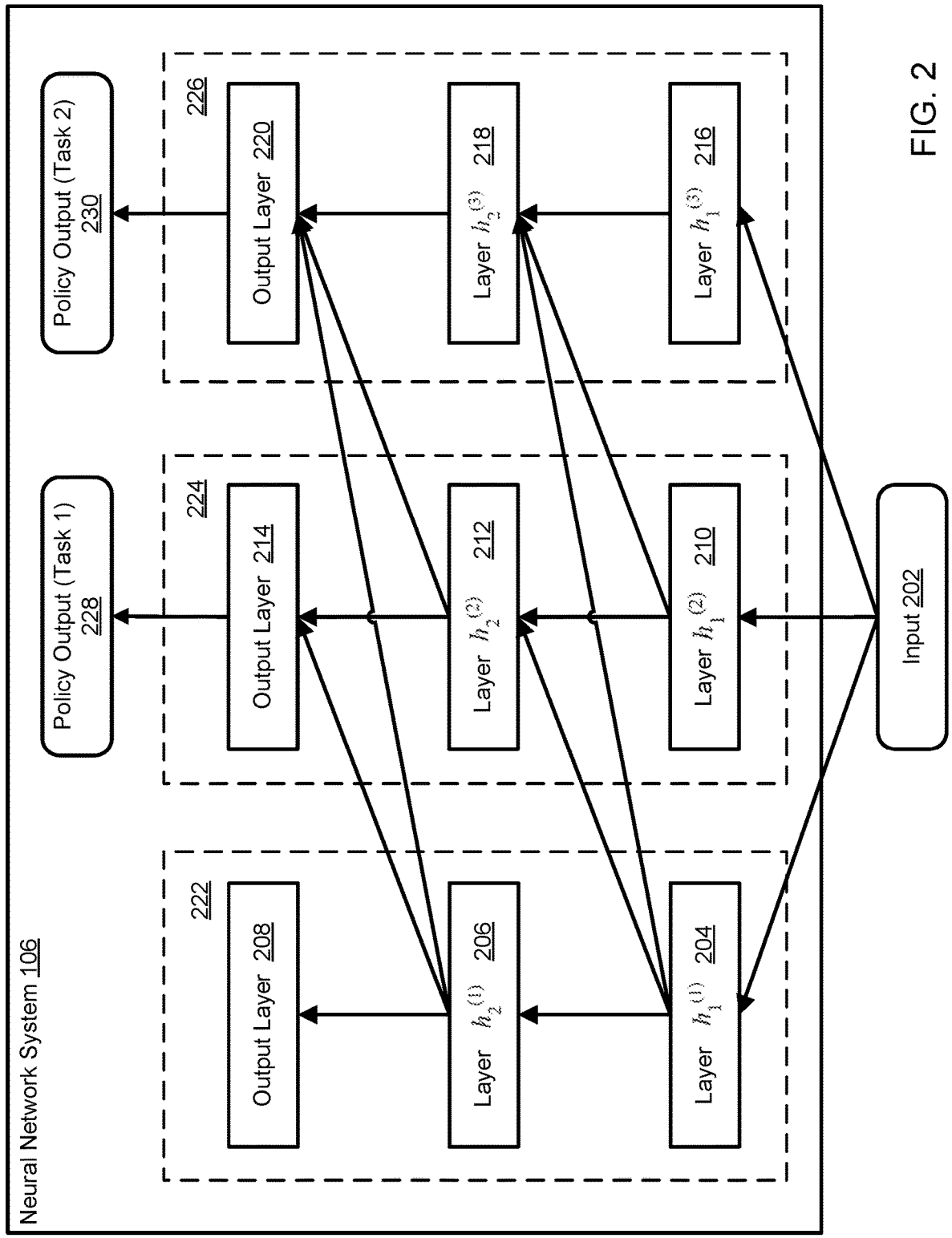
FIG. 2 shows an example architecture of a neural network system.

FIG. 2 shows an example architecture of the neural network system 106 of FIG. 1.

The neural network system 106 includes a sequence of deep neural networks (DNNs).

The sequence of DNNs include a simulation-trained deep neural network (DNN) 222 that has been trained on interactions of a simulated version of a robotic agent with a simulated version of the real-world environment to perform a simulated version of a first robotic task.

In general, the simulation-trained DNN 222 include multiple neural network layers arranged in a stack on top of each other. The simulation-trained DNN 222 can be a feedforward neural network or a recurrent neural network. The simulation-trained DNN 222 can include one or more convolutional neural network layers followed by either a fully connected layer or a long short-term memory (LSTM) neural network layer.

As shown in FIG. 2, the simulation-trained DNN 222 includes multiple first indexed layers, for example, layer $h_1^{(1)}$ (204) and layer $h_2^{(1)}$ (206), and an output layer 208. The simulation-trained DNN 222 is configured to receive an input 202 that includes an observation characterizing a current state of the real-world environment. For example, the observation includes visual data such as one or more RGB images depicting the current state of the real-world environment. The simulation-trained DNN 222 is then configured to process the observation through each of the first indexed layers to generate a respective layer output for each layer. The respective layer output for each layer is then provided as input to the next layer.

The sequence of DNNs further includes a first robot-trained DNN 224. The first robot-trained DNN 224 can be a feedforward or a recurrent neural network. The first robot-trained DNN 224 may include one or more convolutional neural network layers followed by either a fully connected neural network layer or an LSTM neural network layer.

In many cases, the first robot-trained DNN 224 and the simulation-trained DNN 222 do not need to have identical capacity or structure, and this can be an advantage in sim-to-real situations. The simulation-trained DNN 222 can be designed to have sufficient capacity and depth to learn the robotic task from scratch, but the robot-trained DNN 224 can have minimal capacity, to encourage fast learning and limit total parameter growth. Thus, in some cases, the simulation-trained DNN 222 is a standard-sized network while the first robot-trained DNN 224 is a reduced-capacity network to accelerate training. That means the first robot-trained DNN 224 has many fewer parameters than the simulation-trained DNN 222. For example, when the simulation-trained DNN 222 and the first robot-trained DNN 224 are both feedforward neural networks, the simulation-trained DNN 222 may have hundreds of thousands of parameters, e.g., approximately 600,000 parameters while the first robot-trained DNN 224 may have only tens of thousands of parameters, e.g., approximately 40,000 parameters. In another example, when the simulation-trained DNN 222 and the first robot-trained DNN 224 are both recurrent neural networks, the simulation-trained DNN 222 may have approximately 300,000 parameters while the first robot-trained DNN 224 may have approximately 40,000 parameters.

In some cases, the simulation-trained DNN 222 has a wide architecture and the first robot-trained DNN 224 has a narrow architecture. For example, for each of one or more layers of the multiple second indexed layers, a corresponding layer in the multiple first indexed layers having a same index is a neural network layer of a same type but of a larger dimension than the layer in the multiple second indexed layers. For instance, the corresponding layer in the multiple first indexed layers has many more nodes than the layer in the multiple second indexed layer.

As shown FIG. 2, the first robot-trained DNN 224 includes multiple second indexed layers, e.g., layer $h_1^{(2)}$ (210) and layer $h_2^{(2)}$ (212), and an output layer 214.

The first robot-trained DNN 224 is configured to receive input 202 that includes the observation (e.g., RGB images) characterizing the current state of the real-world environment.

Generally, the first robot-trained DNN 224 is configured to collectively process the input 202 through each of multiple second indexed layers to generate the policy output 228 that defines an action to be performed by the robotic agent to perform the first robotic task. The policy output defines a respective change in position of each of multiple degrees of freedom of the agent. The degrees of freedom include one or more joints of the agent and one or more actuators of the agent.

In particular, the first layer, e.g. layer $h_1^{(2)}$ (210), of the multiple second indexed layers is configured to receive the input 202 and to process the input 202 to generate a first layer output.

To transfer features learned from the interactions of the simulated version of the agent for use in selecting actions to be performed by the agent, one or more layers following the first layer 210 in the multiple second indexed layers are each configured to receive as input (i) a layer output generated by a preceding layer of the first robot-trained DNN 224, and (ii) a layer output generated by a preceding layer of the simulation-trained DNN 222. A preceding layer is a layer whose index is one less than the index of the layer. For example, layer $h_2^{(2)}$ (212) is configured to receive as input a layer output generated by layer $h_1^{(2)}$ (210) of the first robot-trained DNN 224 and a layer output generated by layer $h_1^{(1)}$ (204). The system may be configured to apply a first set of parameters (weights) to the layer output generated by the preceding layer of the first robot-trained DNN and to apply a second set of parameters (weights) to the layer output generated by the preceding layer of the simulation-trained DNN. Optionally, the connection between DNN "columns" of the sequence may include a neural network such as an MLP (multilayer perception), to adapt the layer output of one DNN to the layer input of the next DNN, for example for scaling and/or dimensionality reduction. Such adaption may not be necessary when connecting to the output layer.

In some cases, the multiple first indexed layers and the multiple second indexed layers each include a respective recurrent neural network layer. In these cases, the recurrent neural network layer in the multiple second indexed layers is configured to receive as input (i) a layer output of a layer preceding the recurrent neural network layer in the multiple first indexed layers, (ii) an internal state of the recurrent neural network layer in the multiple first indexed layers, and (iii) a layer output of a layer preceding the recurrent neural network layer in the multiple second indexed layers. For example, assuming that layer 206 of the multiple first indexed layers and layer 212 of the multiple second indexed layers are recurrent neural network layers, then the layer 212 is configured to receive as input: a layer output of layer 204, an internal state of the layer 206, and a layer output of layer 210.

Specially, the output layer 214 is configured to receive as input (i) a layer output generated by a layer preceding the output layer of the first robot-trained DNN 224, e.g., the layer output generated by layer $h_2^{(2)}$ (212), and (ii) a layer output generated by a layer preceding an output layer of the simulation-trained DNN 222, e.g., the layer output generated by layer $h_2^{(1)}$ (206). The output layer 214 is configured to apply a first set of parameters to the layer output generated by the layer preceding the output layer of the first robot-trained DNN 224, and to apply a second set of parameters to the layer output generated by the layer preceding the output layer of the simulation-trained DNN 222 to generate a policy output 228. The first set of parameters and the second set of parameters are determined after the first robot-trained DNN 224 is trained on the interactions of the robotic agent with the real-world environment using a reinforcement learning technique. Training the first robot-trained DNN 224 is described in more detail below with reference to FIG. 3.

Optionally, the neural network system 106 may include a second robot-trained DNN 226 that has been trained on interactions of the robotic agent with the real-world environment to perform a second robotic task different from the first robotic task. The second robot-trained DNN 226 includes multiple third indexed layers (e.g., layers $h_1^{(3)}$ (216) and layer $h_2^{(3)}$ (218)), and an output layer 220. The second robot-trained DNN is configured to receive as input additional data characterizing the current state in conjunction with the observation (e.g., RGB images) included in the input 202. For example, the additional data is proprioceptive data including proprioceptive features of the robotic agent such as joint angles and velocities for each of the joints and actuators of the robotic agent.

By taking additional data as input, the second robot-trained DNN allows the neural network system 106 to have a flexibility for adding new capacity, including new input modalities, when transferring to a new task. This is advantageous over existing approaches as existing approaches are unable to accommodate changing network morphology or new input modalities. This is also advantageous for bridging the reality gap, to accommodate dissimilar inputs between simulation and real sensors.

In a variant, the second robot-trained DNN may only receive the additional data and not the observation, and may implicitly receive the observation via a lateral connection to the first robot-trained DNN and/or to the simulation-trained DNN.

The first layer in the multiple third indexed layers, e.g., layer $h_1^{(3)}$ (216), is configured to process the received input 202 and additional data to generate a layer output. One or more layers following the first layer 216 in the second robot-trained DNN 226 are each configured to receive as input (i) a layer output generated by a preceding layer of the first robot-trained DNN 224, (ii) a layer output generated by a preceding layer of the simulation-trained DNN 222, and (iii) a layer output generated by a preceding layer of the second robot-trained DNN 226. For example, layer $h_2^{(3)}$ (218) of the second robot-trained DNN 226 is configured to receive as input a layer output generated by layer $h_1^{(2)}$ (210) of the first robot-trained DNN 224, a layer output generated by layer $h_1^{(1)}$ (204) of the simulation-trained DNN 222, and a layer output generated by layer $h_1^{(3)}$ (216) of the second robot-trained DNN 226.

The one or more layers following the first layer 216 are each configured to process the respective input to generate a respective layer output. The layer output is then provided to the next layer as input, or if there are no layers following the current layer (i.e., the current layer is the output layer 220), as a second policy output 230. The second policy output 230 defines an action to be performed by the robotic agent to perform the second robotic task.

Figure 3:
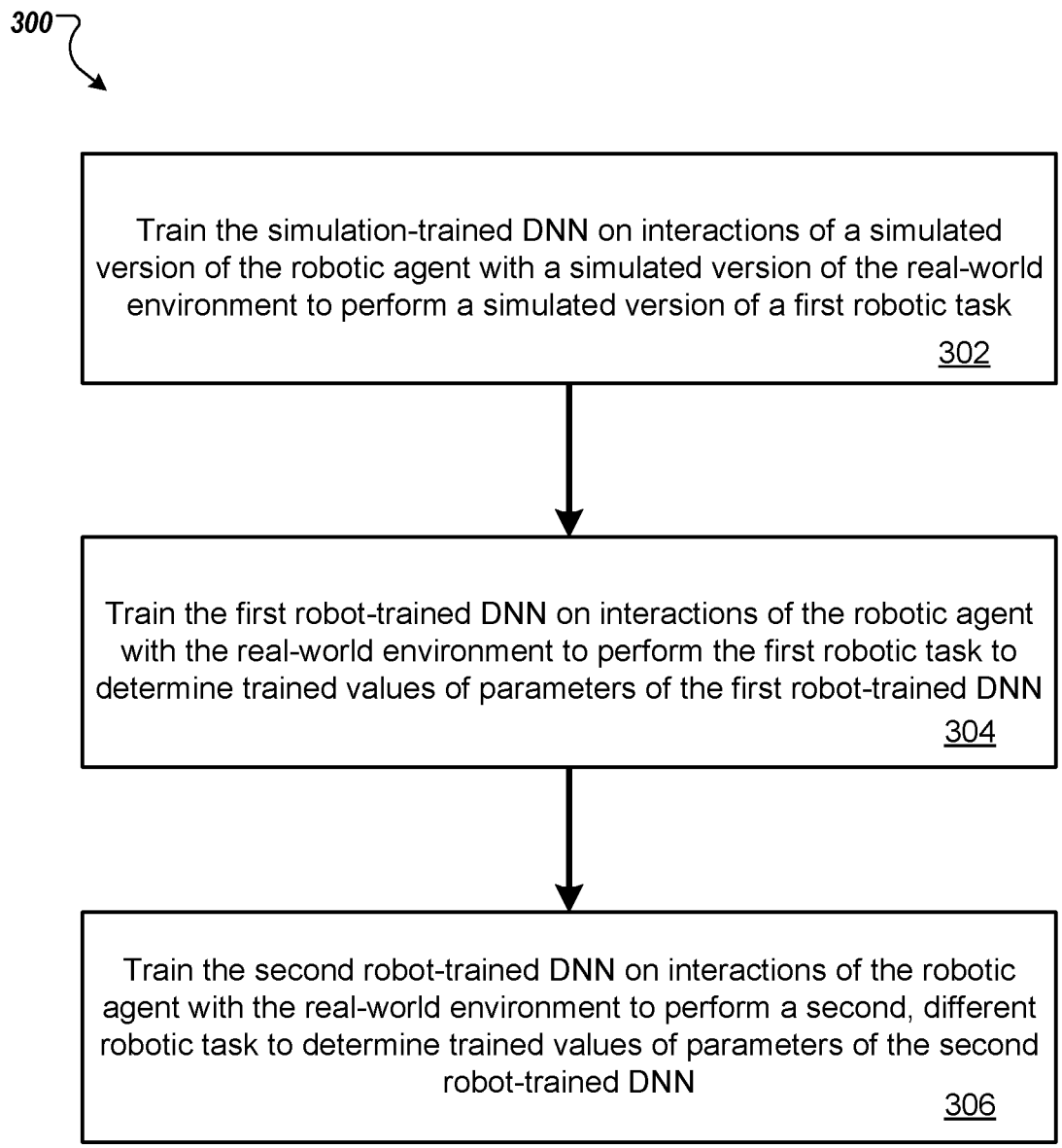
FIG. 3 is a flow diagram of an example process for training the neural network system.

FIG. 3 is a flow diagram of an example process 300 for training a neural network system, for example, the neural network system 106 of FIG. 1. For convenience, the process 300 will be described as being performed by a system of one or more computers located in one or more locations. For example, a reinforcement learning system, e.g., the reinforcement learning system 100 of FIG. 1, appropriately programmed in accordance with this specification, can perform the process 300.

The system first trains the simulation-trained DNN of the neural network system on interactions of a simulated version of the robotic agent with a simulated version of the real-world environment to perform a simulated version of the robotic task (i.e., a real-world task) to determine trained values of parameters of the simulation-trained DNN (step 302). A simulated version of the robotic agent is a virtual 3D model that has similar appearance as the real-world robotic agent and is capable of emulating the motion of the real-world robotic agent. The simulated version of the real-world environment is a virtual 3D environment rendering the real-world environment and objects in the real-world environment. During training, the simulated version of the robotic agent is programmed to move or to interact with virtual objects in the simulated environment in order to complete a simulated version of the real-world task. The system can simulate training input data. For example, if the input data in the real-world environment includes observations captured by a camera, then the simulated input data is provided by a component that is capable of rendering possible observations.

To allow the neural network system to effectively adapt to variation in the real-world task, the real-world environment, and the robotic agent, the system can introduce variance into the training of the simulation-trained DNN. In particular, real-world robotic agents can vary, for example, due to manufacturing inconsistencies. In addition, different instances of the task may vary, e.g., because objects being moved may have slightly different dimensions and real-world agents may have different capabilities for executing selected actions because of manufacturing defects. Therefore, the system can train the simulation-trained DNN on a simulated task that is not exactly the same as the real-world task to allow the simulation-trained DNN to generalize to unpredictable situations that may occur in the real-world.

The system can introduce variance into the training of the simulation-trained DNN in a variety of ways. For example, the system can apply random noise to actions being performed by the agent before the system selects the action. As another example, the system can vary the dimensions of objects in the simulated version of the environment between instances of the simulated task.

The system can train the simulation-trained DNN using a first reinforcement learning technique. For example, the system can train the simulation-trained DNN using an Async Advantage Actor-Critic (A3C) framework. A training method using an A3C framework is described in detail in Volodymyr Mnih, Adrià Puigdoménech Badia, Mehdi Mirza, Alex Graves, Timothy P. Lillicrap, Tim Harley, David Silver, and Koray Kavukcuoglu. *Asynchronous methods for deep reinforcement learning*. In Int'l Conf. on Machine Learning (ICML), 2016. As another example, the system can train the simulation-trained DNN using a policy-gradient actor-critic algorithm such as a Deep Deterministic Policy Gradients (DDPG) algorithm. A training method using a DDPG algorithm is describe in detail in Timothy P. Lillicrap, Jonathan J. Hunt, Alexander Pritzel, Nicolas Heess, Tom Erez, Yuval Tassa, David Silver, Daan Wierstra. *Continuous control with Deep Reinforcement Learning*, available at https://arxiv.org/abs/1509.02971.

The simulation training, compared with the real robot, is accelerated because of fast rendering, multi-threaded learning algorithms, and the ability to continuously train without human involvement. Using simulation, the system can efficiently explore various training parameters. For example, the system can explore learning rates and entropy costs, which are sampled uniformly at random on a log scale.

The system then trains the first robot-trained DNN on interaction of the robotic agent with the real-world environment to perform the first robotic task to determine trained values of parameters of the first robot-trained DNN (step 304). Generally, the system first initializes the values of parameters of the first robot-trained DNN to pre-determined or randomly generated initial values.

In the real-world training, there is a risk that rewards that the system receives as the result of the robotic agent performing actions can be so sparse or non-existent that the convergence rate is small or the convergence will never happen. Thus, in order to maximize the likelihood of reward during exploration in the real domain, the system initializes the first robot-trained DNN such that the initial policy of the robotic agent will be identical to the simulation-trained DNN. Using the example neural network system 106 of FIG. 2, when parameters of the first robot-trained DNN 224 are instantiated, the output layer 214 has input connections from layer 212 and layer 206 of the simulation-trained DNN. Unlike other parameters of the first robot-trained DNN, which are randomly initialized, the values of first parameters that the output layer 214 will apply to the layer output of the layer 212 are initialized to zeros, and the values of second parameters that the output layer 214 will apply to the layer output of the layer 206 are initialized to match trained values of parameters of the output layer of the simulation-trained DNN.

After initializing value of parameters of the first robot-trained DNN, the system trains the first robot-trained DNN on interactions of the agent with the real-world environment to perform the robotic task to determine trained values of parameters of the first robot-trained DNN while holding the trained values of the parameters of the simulation-trained DNN fixed. The first robot-trained DNN can be trained on additional input in addition to observations characterizing the states of the real-world environment. The additional input can be proprioceptive data including proprioceptive features of the robotic agent. The proprioceptive features may include joint angles and velocities for each of the joints and actuators of the robotic agent.

The system can train the first robot-trained DNN on the interactions of the agent using a second reinforcement learning technique. For example, the system can train the first robot-trained DNN using an Async Advantage Actor-Critic (A3C) framework, a policy-gradient actor-critic algorithm such as a Deep Deterministic Policy Gradients (DDPG) algorithm, or other reinforcement learning technique. The second reinforcement learning technique can be the same as the first reinforcement learning technique or be different from the first reinforcement learning technique.

The system then trains the second robot-trained DNN on interactions of the robotic agent with the real-world environment to perform a second, different robotic task to determine trained values of parameters of the second robot-trained DNN (step 306). The system trains the second robot-trained DNN on the second, different robotic task in order to expand the capabilities of the overall system.

The system first initializes the values of parameters of the second robot-trained DNN to randomly generated initial values.

The system trains the second robot-trained DNN using a third reinforcement learning technique using lateral neural connections to both the simulation-trained DNN and the first robot-trained DNN. The third reinforcement learning technique can be, for example, a technique that uses an Async Advantage Actor-Critic (A3C) framework, a policy-gradient actor-critic algorithm such as a Deep Deterministic Policy Gradients (DDPG) algorithm, or other reinforcement learning technique. Being trained in this manner, the second robot-trained DNN may take advantages of features or representations learnt for the first robotic task, as encoded in the simulation-trained DNN or the first robot-trained DNN to improve learning speed for the second robotic task. For example, the first robotic task may be reaching for a static object and the second task may be reaching for a dynamic, moving object.

In some implementations, the second robot-trained DNN can be trained on additional input in addition to observations characterizing the states of the real-world environment. The additional input can be proprioceptive data including proprioceptive features of the robotic agent. The proprioceptive features may include joint angles and velocities for each of the joints and actuators of the robotic agent. In some implementations, during training, the second robot-trained DNN may only receive the additional data and not the observation, and may implicitly receive the observation via a lateral connection to the first robot-trained DNN and/or to the simulation-trained DNN.

Figure 4:
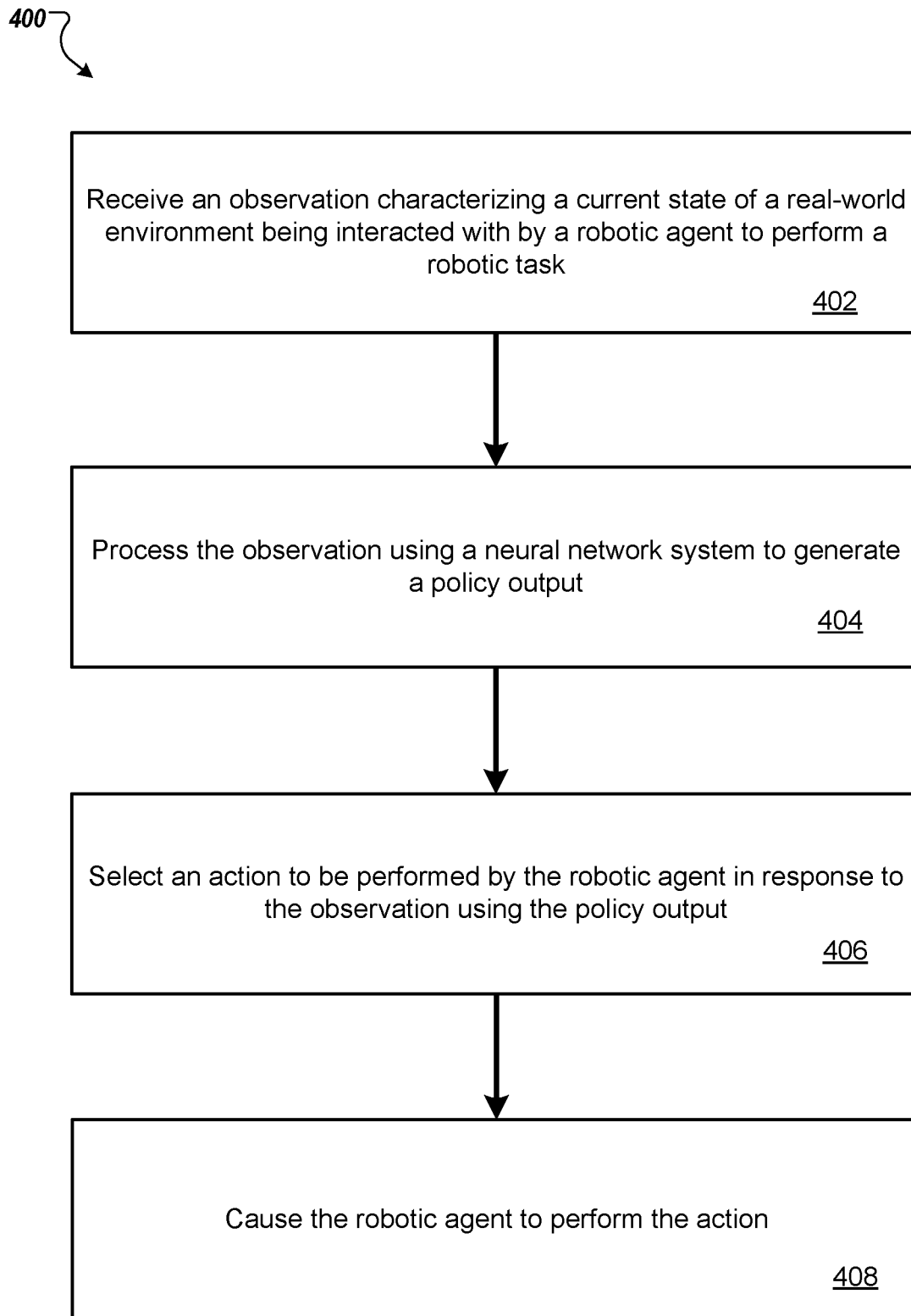
FIG. 4 is a flow diagram of an example process for selecting an action to be performed by an agent in response to an observation.

FIG. 4 is a flow diagram of an example process 400 for selecting an action to be performed by an agent in response to an observation. For convenience, the process 400 will be described as being performed by a system of one or more computers located in one or more locations. For example, a reinforcement learning system, e.g., the reinforcement learning system 100 of FIG. 1, appropriately programmed in accordance with this specification, can perform the process 400.

The system receives an observation characterizing a current state of a real-world environment being interacted with by an agent to perform a robotic task (step 402). The observation characterizes the current state of the environment using high-dimensional pixel inputs from one or more images that characterize the current state of the environment, e.g., images captured by sensors of the agent as it interacts with the real-world environment.

The system then processes the observation using a neural network system to generate a policy output (step 404). The system processes the observation in accordance with the trained values of parameters of the neural network system. Generally, the policy output defines a probability distribution over a set of possible actions that could be performed by the agent in response to the observation. For example, in some implementations, the agent has multiple degrees of freedom that includes one or more joints and one or more actuators (e.g., a robot arm that has multiple joints and fingers). In these implementations, the policy output defines a probability distribution over possible actions that control the different degrees of freedom of the agent, e.g., actions that control the change in position of each degree of freedom of the agent, in response to the observation. For example, in the case of a robot arm, the actions may comprise velocity commands for the arm and finger joints.

The system selects an action to be performed by the agent in response to the observation using the policy output (step 406). In particular, the system selects the action by sampling the action from the probability distribution defined by the policy output.

The system then causes the agent to perform the action (step 408).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A system comprising:
a neural network system implemented by one or more computers,
wherein the neural network system is configured to receive an observation characterizing a current state of a real-world environment being interacted with by a robotic agent to perform a robotic task and to process the observation to generate a policy output that defines an action to be performed by the robotic agent in response to the observation,
wherein the neural network system comprises a sequence of deep neural networks (DNNs), and
wherein the sequence of DNNs comprises:
a simulation-trained DNN that has been trained on interactions of a simulated version of the robotic agent with a simulated version of the real-world environment to perform a simulated version of the robotic task, wherein:
the simulation-trained DNN comprises a first plurality of indexed layers, and
the simulation-trained DNN is configured to receive the observation and process the observation through each layer in the first plurality of indexed layers to generate a respective layer output for each layer in the first plurality of indexed layers; and
a first robot-trained DNN that has been trained on interactions of the robotic agent with the real-world environment to perform the robotic task to determine trained values of parameters of the first robot-trained DNN while holding trained values of the parameters of the simulation-trained DNN fixed, wherein
the first robot-trained DNN comprises a second plurality of indexed layers,
the first robot-trained DNN is configured to receive the observation and to process the observation through each layer in the second plurality of indexed layers to generate the policy output, and
one or more of the layers in the second plurality of indexed layers are each configured to receive as input (i) a layer output generated by a preceding layer of the first robot-trained DNN, and (ii) a layer output generated by a preceding layer of the simulation- trained DNN, wherein a preceding layer is a layer whose index is one less than the index of the layer.

2. The system of claim 1, wherein the first robot-trained DNN has been trained on interactions of the robotic agent with the real-world environment to perform the robotic task.

3. The system of claim 1, wherein the first robot-trained DNN has fewer parameters than the simulation-trained DNN.

4. The system of claim 1, wherein, for each of one or more layers of the second plurality of indexed layers, a corresponding layer in the first plurality of indexed layers having a same index is a neural network layer of a same type but of a larger dimension than the layer in the second plurality of indexed layers.

5. The system of claim 1, wherein the first plurality of indexed layers and the second plurality of indexed layers each include a respective recurrent neural network layer.

6. The system of claim 5, wherein the recurrent neural network layer in the second plurality of indexed layers is configured to receive as input (i) a layer output of a layer preceding the recurrent neural network layer in the first plurality of indexed layers, (ii) an internal state of the recurrent neural network layer in the first plurality of indexed layers, and (iii) a layer output of a layer preceding the recurrent neural network layer in the second plurality of indexed layers.

7. The system of claim 1, wherein each of the one or more of the layers in the second plurality of indexed layers that are configured to receive as input (i) a layer output generated by a preceding layer of the first robot-trained DNN, and (ii) a layer output generated by a preceding layer of the simulation-trained DNN is further configured to:
apply a respective first set of parameters to the layer output generated by the preceding layer of the first robot-trained DNN; and
apply a respective second set of parameters to the layer output generated by the preceding layer of the simulation-trained DNN.

8. The system of claim 1, wherein the policy output defines a respective change in position of each of a plurality of degrees of freedom of the robotic agent.

9. The system of claim 1, wherein the plurality of degrees of freedom include one or more joints of the robotic agent and one or more actuators of the robotic agent.

10. The system of claim 1, further comprising:
an action subsystem configured to:
select an action to be performed by the robotic agent based on the policy output; and
cause the robotic agent to perform the selected action.

11. The system of claim 1, wherein the sequence of DNNs further comprises:
a second robot-trained DNN, wherein:
the second robot-trained DNN comprises a third plurality of indexed layers, and
one or more of the layers in the third plurality of indexed layers are each configured to receive as input (i) a layer output generated by a preceding layer of the first robot-trained DNN, (ii) a layer output generated by a preceding layer of the simulation-trained DNN, and (iii) a layer output generated by a preceding layer of the second robot-trained DNN.

12. The system of claim 11, wherein:
the second robot-trained DNN is configured to receive different data characterizing the current state in conjunction with the observation; and
the second robot-trained DNN is configured to process the different data through the third plurality of indexed layers to generate a second policy output that defines an action to be performed by the robotic agent to perform a second, different robotic task.

13. The system of claim 12, wherein the observation is visual data and the different data is proprioceptive data.

14. A method of training a neural network system comprising a sequence of deep neural networks (DNNs) to determine trained values of parameters of one or more of the DNNs in the sequence of DNNs, wherein the neural network system is configured to receive an observation characterizing a current state of a real-world environment being interacted with by a robotic agent to perform a robotic task and to process the observation to generate a policy output that defines an action to be performed by the robotic agent in response to the observation, wherein the sequence of DNNs comprises:
- a simulation-trained DNN that has been trained on interactions of a simulated version of the robotic agent with a simulated version of the real-world environment to perform a simulated version of the robotic task, wherein the simulation-trained DNN comprises a first plurality of indexed layers and is configured to receive the observation and process the observation through each layer in the first plurality of indexed layers to generate a respective layer output for each layer in the first plurality of indexed layers; and
- a first robot-trained DNN, wherein
  - the first robot-trained DNN comprises a second plurality of indexed layers,
  - the first robot-trained DNN is configured to receive the observation and to process the observation through each layer in the second plurality of indexed layers to generate the policy output, and
  - one or more of the layers in the second plurality of indexed layers are each configured to receive as input (i) a layer output generated by a preceding layer of the first robot-trained DNN, and (ii) a layer output generated by a preceding layer of the simulation- trained DNN, wherein a preceding layer is a layer whose index is one less than the index of the layer, wherein the method comprises:
- training the first robot-trained DNN on interactions of the robotic agent with the real-world environment to perform the robotic task to determine trained values of parameters of the first robot-trained DNN while holding trained values of the parameters of the simulation-trained DNN fixed.

15. The method of claim 14,
wherein an output layer of the first robot-trained DNN is configured to:
- receive as input (i) a layer output generated by a layer preceding the output layer of the first robot-trained DNN, and (ii) a layer output generated by a layer preceding an output layer of the simulation-trained DNN;
- apply a first set of parameters to the layer output generated by a layer preceding the output layer the first robot-trained DNN; and
- apply a second set of parameters to the layer output generated by a layer preceding the output layer of the simulation-trained DNN, and wherein the method further comprises:
- initializing values of the second set of parameters to match trained values of parameters of the output layer of the simulation-trained DNN.

16. The method of claim 15, further comprising:
initializing values of the first set of parameters to zero.

17. The method of claim 15, further comprising:
initializing values of parameters of layers of the first robot-trained DNN other than the output layer to random values.

18. The method of claim 14, further comprising:
training the simulation-trained DNN on interactions of a simulated version of the robotic agent with a simulated version of the real-world environment to perform a simulated version of the robotic task to determine trained values of parameters of the simulation-trained DNN.

19. The method of claim 18, wherein training the simulation-trained DNN comprises training the simulation-trained DNN on the interactions of the simulated version of the robotic agent using a first reinforcement learning technique.

20. The method of claim 19, wherein training the first robot-trained DNN comprises training the first robot-trained DNN on the interactions of the robotic agent using a second reinforcement learning technique.